(12) United States Patent
Endo et al.

(10) Patent No.: US 7,555,379 B2
(45) Date of Patent: Jun. 30, 2009

(54) GUIDING DEVICE FOR GUIDING VEHICLE TO TARGET PLACE CONTROLLING THE STEERING ANGLE

(75) Inventors: Tomohiko Endo, Toyota (JP); Hisashi Satonaka, Susono (JP); Yuichi Kubota, Okazaki (JP); Akira Matsui, Toyota (JP); Hideyuki Iwakiri, Tajimi (JP); Toru Sugiyama, Toyota (JP); Seiji Kawakami, Susono (JP); Katsuhiko Iwazaki, Suntou-gun (JP); Hiroaki Kataoka, Susono (JP); Yuu Tanaka, Aichi-gun (JP)

(73) Assignees: Toyota Jidosha Kabushiki Kaisha, Toyota-shi (JP); Aisin Seki Kabushiki Kaisha, Kariya-shi (JP)

(*) Notice: Subject to any disclaimer, the term of this patent is extended or adjusted under 35 U.S.C. 154(b) by 478 days.

(21) Appl. No.: 10/565,642

(22) PCT Filed: Jul. 15, 2004

(86) PCT No.: PCT/JP2004/010454

§ 371 (c)(1),
(2), (4) Date: May 23, 2006

(87) PCT Pub. No.: WO2005/007490

PCT Pub. Date: Jan. 27, 2005

(65) Prior Publication Data
US 2007/0198152 A1    Aug. 23, 2007

(30) Foreign Application Priority Data
Jul. 23, 2003    (JP)    ............................. 2003-200574

(51) Int. Cl.
B62D 6/00    (2006.01)
(52) U.S. Cl. ........................................ 701/41; 701/200

(58) Field of Classification Search .................... 701/1, 701/36, 23–26, 73, 41, 200; 180/167–169; 303/149–150
See application file for complete search history.

(56) References Cited

U.S. PATENT DOCUMENTS 5,172,317 A * 12/1992 Asanuma et al. ............... 701/28

(Continued)

FOREIGN PATENT DOCUMENTS

DE    199 40 007 A    3/2001

(Continued)

OTHER PUBLICATIONS

Japanese Language Version of Japanese Office Action issued May 19, 2006.

(Continued)

*Primary Examiner*—Yonel Beaulieu
(74) *Attorney, Agent, or Firm*—Kenyon & Kenyon LLP (57) ABSTRACT

A guiding device is disclosed for guiding a vehicle to a target position by controlling the steering angle while estimating the vehicle position at least based on a steering angle value, characterized in that, in estimating the vehicle position, a slowing operation with respect to a change dp in a moving distance of the vehicle is applied to a turning curvature g(Str (p)) estimated based on the steering angle value in order to compensate for the delay due to tire deformation, whereby the delay-compensated turning curvature y(p) is obtained.

8 Claims, 6 Drawing Sheets

U.S. PATENT DOCUMENTS 5,742,141 A 4/1998 Czekaj
7,053,795 B2 * 5/2006 Maemura et al. ......... 340/932.2

FOREIGN PATENT DOCUMENTS

| EP | 0 872 402 | A2 | 10/1998 |
| EP | 1 249 379 | A2 | 10/2002 |
| EP | 1 297 999 | A2 | 4/2003 |
| EP | 1 361 458 | A1 | 11/2003 |
| JP | 2002-308313 | A | 12/1990 |
| JP | 10-264839 | A | 10/1998 |
| JP | H11-34899 | | 2/1999 |
| JP | 2003-205807 | | 7/2003 |

OTHER PUBLICATIONS

Japanese English Translation of Japanese Office Action issued May 19, 2006.

* cited by examiner

FIG.7

GUIDING DEVICE FOR GUIDING VEHICLE TO TARGET PLACE CONTROLLING THE STEERING ANGLE

This is a 371 national phase application of PCT/JP2004/010454 filed 15 Jul. 2004, claiming priority to Japanese Patent Application No. 2003-200574 filed 23 Jul. 2003, the contents of which are incorporated herein by reference.

FIELD OF THE INVENTION

The present invention relates to a guiding device for a vehicle that guides the vehicle to move to a target position by estimating the current position of the vehicle at least based on a steering angle.

BACKGROUND OF THE INVENTION

A guiding device disclosed in JP02-308313 A guides a vehicle to move to a target position set by a user on a setting screen, in which the guiding is carried out by creating in real time a target track (orbit) from the current position of the vehicle to the target position while estimating the current position of the vehicle, and by controlling a steering angle based on the created target track.

A guiding device disclosed in JP10-264839 A estimates the current position of the vehicle based on respective wheel speeds detected by wheel speed sensors and a yaw rate detected by a yaw rate sensor and judges whether the estimated current position of the vehicle departs from a target track. If the estimated current position departs from the target track, steering angles of the wheels are controlled according to the departure amount in order to correct the departure from the target track.

In order to guide a vehicle to a target position, it is required to monitor in real time a relationship between the current position of the vehicle and the target track during movement of the vehicle. This means that estimation of the current vehicle position plays an important role. Generally, the estimation of the current vehicle position is based on a controlled steering angle and a movement amount (moving distance) of the vehicle, that are detected, for instance, by a yaw rate sensor and a wheel speed sensor as in the aforementioned prior art. However, even in the case of steering angle being controlled precisely according to target steering angles, there is a difference between the estimated vehicle position and the actual vehicle position. The difference cannot be detected by a system, because steering angle is controlled precisely according to target steering angles. As a result of this, the difference is not corrected for and thus the vehicle is guided to the wrong. Therefore, it is desired to find the main factors causing such differences and compensate for the differences in order to improve the accuracy of the guiding control.

SUMMARY OF THE INVENTION

Therefore, it is an object of the present invention to provide a guiding device that guides a vehicle based on more accurate estimated vehicle positions and a vehicle position estimating device that estimates a vehicle position more accurately.

In order to achieve the above-mentioned objects, according to one aspect of the present invention a guiding device for guiding a vehicle to a target position by controlling a steering angle while estimating the vehicle position at least based on a steering angle value is provided, which is characterized in that, in estimating the vehicle position, a slowing operation with respect to a change in a moving distance of the vehicle is applied to a turning curvature that is estimated based on the steering angle value.

According to this aspect of the present invention, it is possible to precisely estimate the vehicle position by slowing the turning curvature, which is estimated based on the steering angle value, with respect to a change in the moving distance of the vehicle. Here, it is noted that the slowing operation with respect to a change in the moving distance of the vehicle is not a slowing operation with respect to a change in time. The moving distance of the vehicle corresponds to the distance over the moving trajectory of the vehicle, that is, the distance traveled. The slowing operation is not necessarily applied to the turning curvature that has been estimated. That is to say, it may be applied at any stage of a turning curvature estimating process. The steering angle value, which is used in the estimating process, may be a controlled steering angle (i.e., a target steering angle). However, preferably, the steering angle detected by the steering angle sensor is used, because there is a possibility that the steering angle has not been controlled precisely according to the intent of the steering angle control.

In this aspect of the present invention, the degree of slowing in the slowing operation is controlled based on detection of changes in characteristics of a tire and/or on detection of the friction coefficient of a road.

According to another aspect of the present invention a vehicle position estimating device is provided, comprising: a detector for detecting a moving distance of a vehicle; a change amount calculator for calculating an amount of a change in the direction of the vehicle every small moving distance based on a steering angle value; and a vehicle position estimator for estimating the position of the vehicle based on the amount of the change in the direction of the vehicle calculated by the change amount calculator; wherein in calculating the amount of the change in the direction of the vehicle, the change amount calculator applies a slowing operation, with respect to a change in the moving distance of the vehicle, to a turning curvature that is estimated based on the steering angle value.

According to this aspect of the present invention, it is possible to precisely estimate the vehicle position by slowing the turning curvature, which is estimated based on the steering angle value, with respect to a change in the moving distance of the vehicle.

Other objects, features and advantages of the present invention will become more apparent from the following detailed description when read in conjunction with the accompanying drawings.

DETAILED DESCRIPTION

Hereafter, the preferred embodiments according to the present invention are explained with reference to the drawings.

Figure 1:
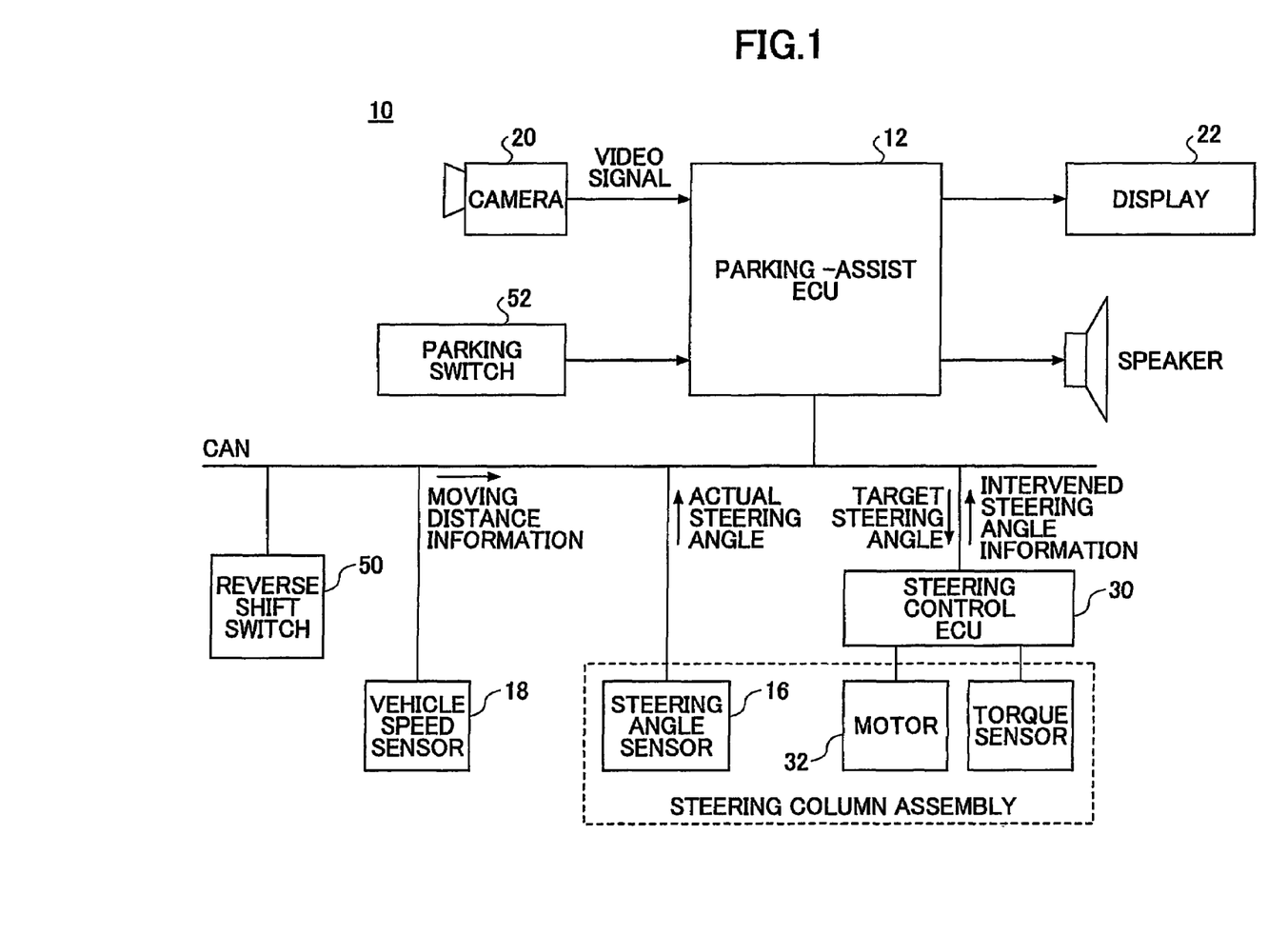
FIG. 1 is a block diagram of a system configuration of a guiding device 10 for a vehicle according to one embodiment of the present invention.

FIG. 1 shows a system configuration of a guiding device 10 for a vehicle according to one embodiment of the present invention. As shown in FIG. 1, the guiding device 10 has an electronic control unit 12 for assisting parking operations of the vehicle (hereafter referred to a PARKING-ASSIST ECU 12). The PARKING-ASSIST ECU 12 is a microprocessor that includes a CPU, a ROM, a RAM, etc., which are interconnected via appropriate buses. In the ROM is stored the computer readable programs to be carried out by the CPU or data (specifications) of the vehicle, such as a length L of the wheelbase.

To the PARKING-ASSIST ECU 12 are connected a steering angle sensor 16 for detecting the steering angle of the steering wheel (not shown), and a vehicle speed sensor 18 for detecting the speed of the vehicle, via appropriate buses such as a CAN (Controller Area Network) or a high-speed communication bus. The vehicle speed sensor 18 may be wheel speed sensors provided on individual wheels, each of which generates pulse signals according to a rotating speed of the corresponding wheel.

To the PARKING-ASSIST ECU 12 are also connected a reverse shift switch 50 and a parking switch 52. The reverse shift switch 50 outputs an ON signal when a shift lever is shifted to the reverse position and otherwise outputs an OFF signal. The parking switch 52 is provided in the cabin of the vehicle so as to allow a user in the cabin to operate it. The parking switch 52 outputs an OFF signal in its normal state and outputs an ON signal when operated by the user. The PARKING-ASSIST ECU 12 determines whether the vehicle is in a state of rolling backward based on the output signal of the reverse shift switch 50, and determines whether the user needs assistance in parking the vehicle based on the output signal of the parking switch 52.

Figure 2:
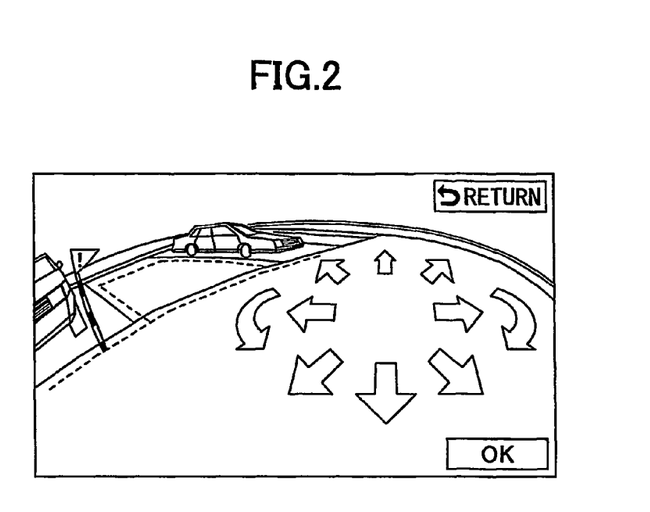
FIG. 2 is an image of an example of a touch switch panel for setting a target-parking position displayed on the display 22.

To the PARKING-ASSIST ECU 12 are also connected a back monitoring camera 20 disposed at the center of a rear bumper and a display 22 provided in the cabin. The back monitoring camera 20 is a CCD camera, which images a scene behind the vehicle with a predetermined viewing angle. The back monitoring camera 20 sends the video signal representative of the captured images to the PARKING-ASSIST ECU 12. Then, on the display 22 are displayed the captured image and a touch switch panel for setting a target-parking position (see FIG. 3). A user operates the touch switch panel on the display 22 and adjusts the position of a pictorial display like a parking frame (shown by broken lines) superposed on the captured image with respect to an actual parking frame (shown by solid lines). In this way, when the position of the pictorial display of the parking frame is confirmed, the PARKING-ASSIST ECU 12 recognizes a target-parking position based on the position of the pictorial display in the screen of the display 22.

To the PARKING-ASSIST ECU 12 is connected a steering system ECU 30 for controlling the steering system of the vehicle via an appropriate bus. During the parking-assist control, the PARKING-ASSIST ECU 12 sends control signals representative of the target steering angles, which are determined as described below in detail, to the steering system ECU 30. The steering system ECU 30 controls a motor 32 for rotating a steering shaft in response to the control signals so as to implement the target steering angles.

Figure 3:
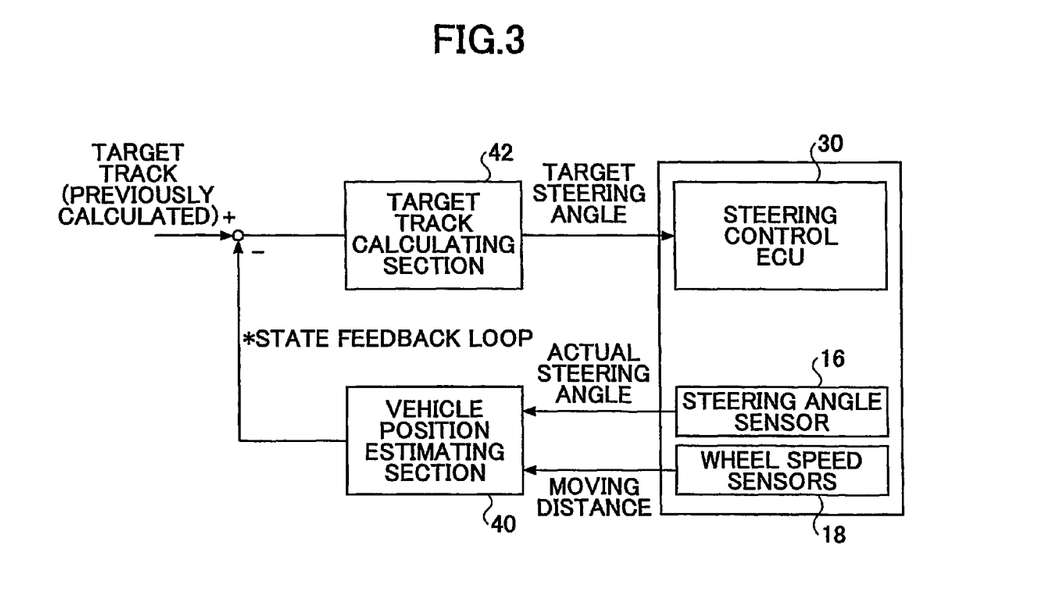
FIG. 3 is a block diagram for showing functions of the PARKING-ASSIST ECU 12.

FIG. 3 is a block diagram for showing functions of the PARKING-ASSIST ECU 12. The PARKING-ASSIST ECU 12 includes a vehicle position estimating section 40 and a target track calculating section 42. As described below in detail, the vehicle position estimating section 40 estimates the position of the vehicle during the parking-assist control based on the output signals of the steering angle sensor 16 and the vehicle speed sensor 18. The target track calculating section 42 calculates a target track based on the difference between the target track previously calculated and the vehicle position estimated by the vehicle position estimating section 40, and determines a target steering angle at the vehicle position based on the calculated target track. The steering system ECU 30 controls a motor 32 according to the target steering angle determined in this way. It is noted that the target track calculating section 42 may calculate the target track every predetermined moving amount of the vehicle. In order to certify the later correction of the target track, the initial calculation of target track may be constrained by a certain turning curvature less than a maximum turning curvature (e.g., 90 percent of the maximum turning curvature) of the vehicle. This helps to provide smooth steering control free from user discomfort. However, the present invention is not limited to this kind of a target track calculating method. For example, the present invention can be applied to a parking-assist control where the vehicle is forced to guide based on the initially calculated target track without recalculating the target track.

Figure 4:
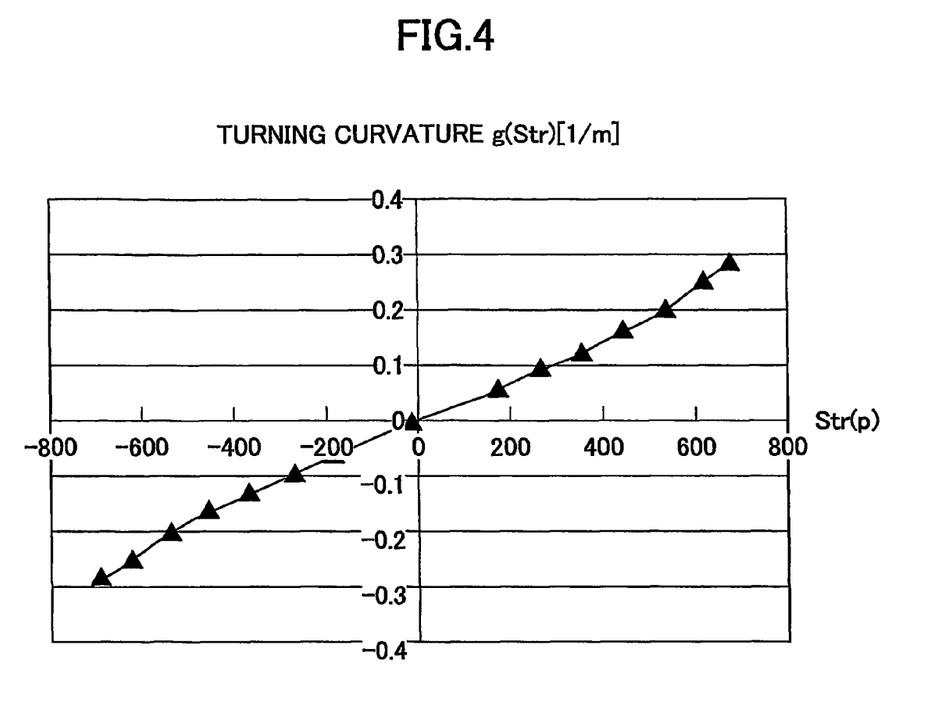
FIG. 4 is a graphic example of a turning characteristic map.

Here, in advance of a description of a vehicle position estimating method according to the present invention, a conventional method is described. Conventionally, the vehicle position is estimated using the following formulas:

$$\theta = \int g(Str(p)) \cdot dp \quad (1)$$

$$X = X_0 - \int \sin\theta \cdot dp \quad (2)$$

$$Y = Y_0 - \int \cos\theta \cdot dp \quad (3)$$

where X and Y are coordinate values of the vehicle position in two dimensions with respect to the center of the rear axle of the vehicle. $X_0$ and $Y_0$ are initial values, that is, the coordinate values at the beginning of the parking-assist control. dp is a small moving distance of the vehicle that is derived by integrating the output signals (pulses) of the vehicle speed sensor 18. θ is a change in an angle (direction) of the vehicle generated at the turning of the vehicle. g(Str(p)) in the formula (1) is a turning curvature that is derived from a predetermined turning characteristic map (look-up-table), as shown in FIG. 4, using a steering position Str(p) obtained from the steering angle sensor 16 as an argument. The turning characteristic map shown in FIG. 4 is made based on the actual turning curvatures measured by RTK-GPS (Real Time Kinematic-Global Positioning System) at the orbiting (turning) of the vehicle with constant steering angles set at regular intervals.

Figure 5:
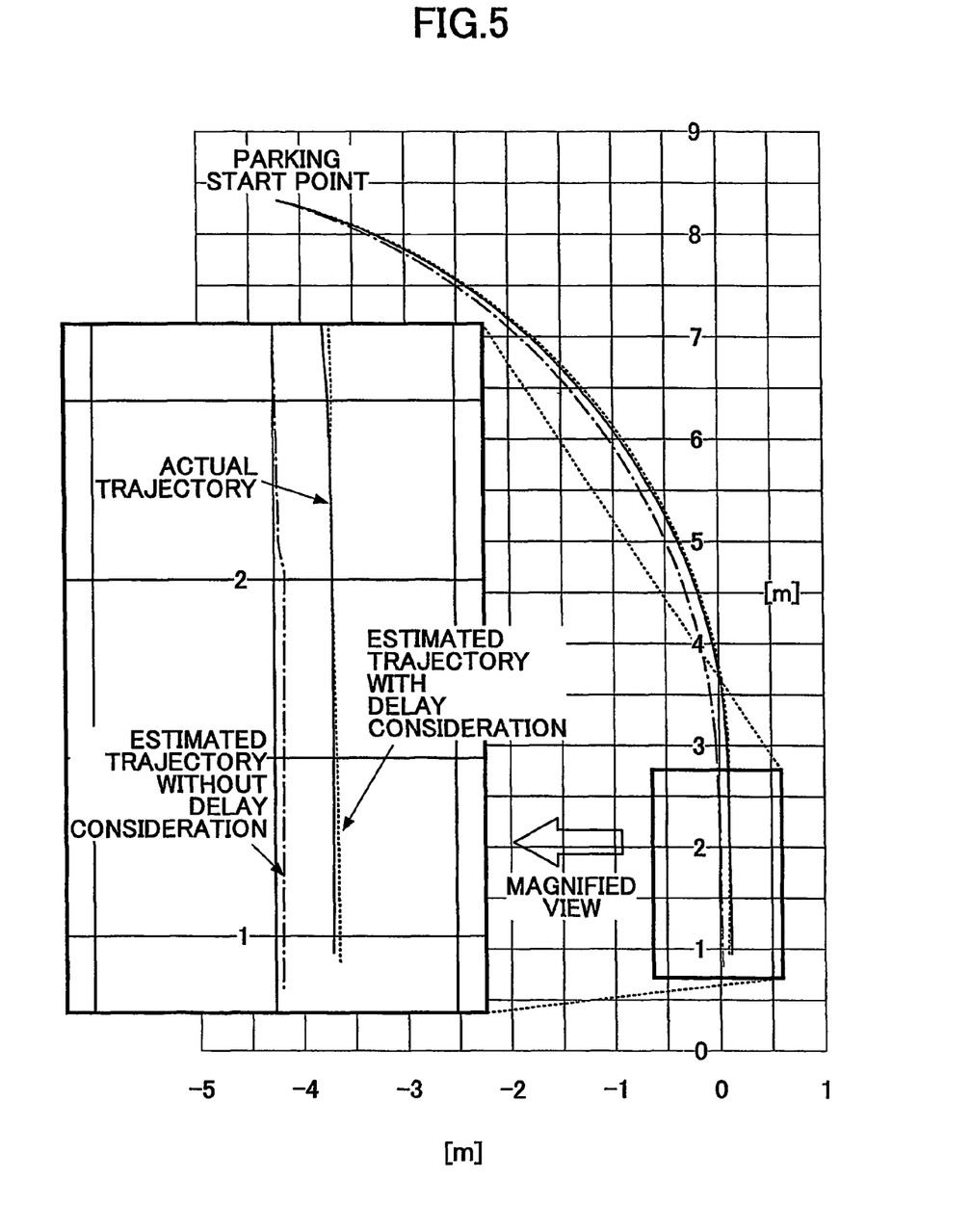
FIG. 5 graphically shows a relationship between the estimated trajectory of the vehicle and the actual trajectory of the vehicle.

FIG. 5 shows test results in which the relationship between the trajectory of the vehicle calculated by the aforementioned traditional vehicle position estimating method (indicated by the one-dot chain line) and the trajectory of the vehicle actually measured by the RTK-GPS (indicated by solid line) is shown. It can be understood from FIG. 5 that the trajectory of the vehicle calculated according to the aforementioned traditional estimating method departs from the actual trajectory. This departure from the actual trajectory (i.e., error of estimation of the vehicle position) cannot be detected by the system (the PARKING-ASSIST ECU 12) without sensing the actual vehicle position.

As a result of research and tests, the inventors of the present invention found that a dynamic delay of a turning curvature due to torsional deformation of tires is the main factor that causes the aforementioned error of estimation of the vehicle position. When the tire is subject to torsional deformation, the traveling direction of the vehicle doesn't strictly correspond to the steering directions of the wheels, and the actual turning curvature doesn't follow the estimated turning curvature derived based on the output signal of the steering angle sensor 16 until the torsional deformation is relieved by the further movement of the vehicle.

Figure 6A:
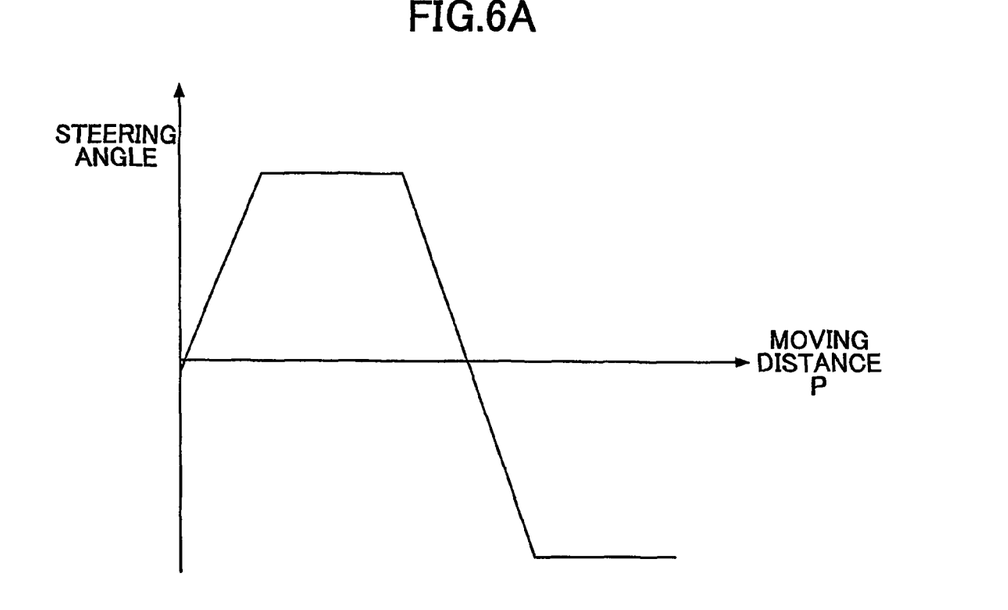
FIG. 6 graphically shows a relationship between the estimated turning curvature without consideration of the dynamic delay and the actual turning curvature.
Figure 6B:
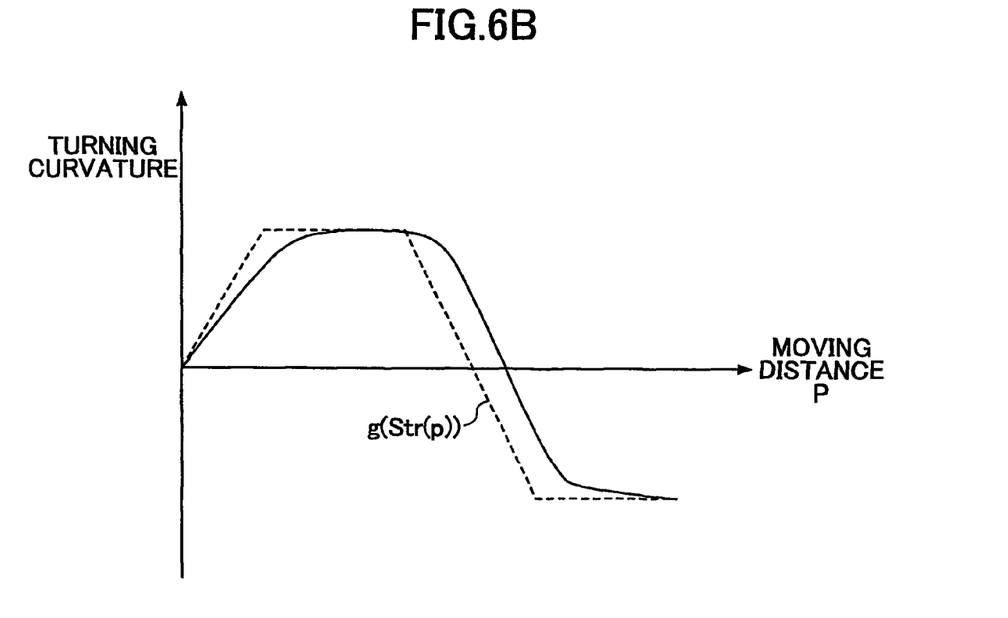

FIG. 6 is a conceptual graph in which the relationship between the estimated turning curvature g(Str(p)) without consideration of the dynamic delay and the actual turning curvature. As the steering position Str(p) changes as a function of a moving distance p as shown in the upper part of FIG. 6, the turning curvature g(Str(p)) without consideration of the dynamic delay changes linearly in response to the change of the Str(p) as indicated by the broken lines in the lower part of FIG. 6. On the other hand, it is predicted that the actual turning curvature responds to the change of the Str(p) with a delay due to the torsional deformation of the tire, as indicated by the solid line in the lower part of FIG. 6.

For this reason, according to the present invention, the vehicle position estimating calculation applies "a slowing (smoothing) operation" to the estimated turning curvature g(Str(p)) derived from the output signals of the steering angle sensor 16, whereby the dynamic delay of the turning curvature is compensated for. The "slowing operation" used hereby indicates not a general slowing operation with respect to time but a slowing operation with respect to the change in the moving distance. More specifically, The "slowing operation" is to identify (mathematically express) the dynamic delay of the turning curvature which occurs, for instance, in the case of the tire having the torsional deformation where the direction of the vehicle doesn't correspond to the steering angle of the tire and the actual turning curvature doesn't follow the estimated turning curvature until the torsional deformation is relieved by the further movement of the vehicle. Therefore, even if time goes by, the "slowing operation" is not applied when the moving distance is zero. This idea is based on the fact that the restoration of the torsional deformation of the tire occurs not because of the passage of time but because of the rotation of the tire, that is, the movement of the vehicle.

Figure 7:
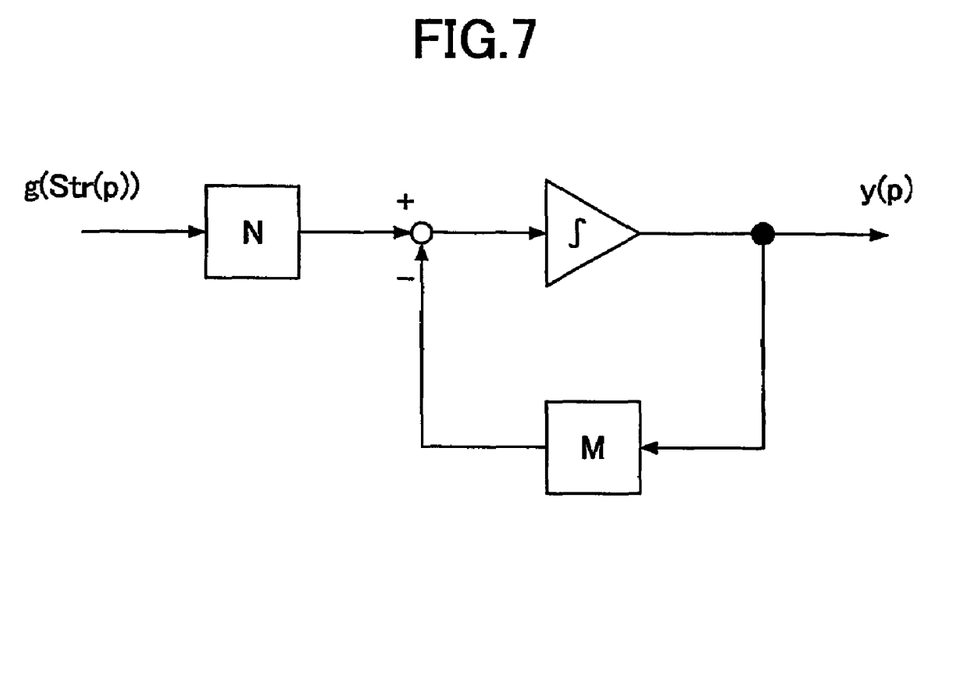
FIG. 7 is a block diagram of the vehicle position estimating section 40.

In this embodiment, based on the findings that "the dynamic delay of the turning curvature can be identified using a formula that expresses first-order delay with respect to a moving distance p", the following formula of first-order delay is used to apply the "slowing operation" to the estimated turning curvature g(Str(p)) derived from the output signals of the steering angle sensor 16, as shown in the block diagram of FIG. 7.

$$\frac{d\,y(p)}{d\,p} = -M \cdot y(p) + N \cdot g(Str(p))$$

Specifically, the vehicle position estimating section 40 according to this embodiment obtains a turning curvature y(p) with consideration of the aforementioned dynamic delay by multiplying the input g(Str(p)) by a coefficient N, subtracting the feedback output y(p) multiplied by a coefficient M from the N·g(Str(p)), and then integrating this value N·g(Str(p))−M·y(p). Then, the vehicle position estimating section 40 adopts the estimated turning curvature y(p) with consideration of the delay instead of the estimated turning curvature g(Str(p)) without consideration of the delay in the formula (1) and then estimates the vehicle position (X, Y) using the formulas (2) and (3). The vehicle position estimating section 40 may do this estimating calculation of the vehicle position whenever the vehicle moves by a predetermined moving distance. In this case, the change of the angle of the vehicle θ may be calculated, for instance, by multiplying the turning curvature y(p) obtained every 0.01 m of moving distance by that small moving distance 0.01, and integrating these multiplied values obtained every 0.05 m of moving distance.

The coefficients N and M are identified such that the trajectory of the vehicle position (X, Y) obtained as mentioned above corresponds to the actual trajectory (see FIG. 5). In FIG. 5, the trajectory of the vehicle position, which is estimated using the identified coefficients N and M, is shown by the dotted line. As shown in an enlarged part of FIG. 5, the trajectory without consideration of the delay (indicated by the one-dot chain line) departs from the actual trajectory (indicated by a solid line) as above-mentioned while the trajectory with consideration of the delay substantially corresponds to the actual trajectory. This shows that the identification of the coefficients N and M is implemented successfully by the first-order delay formula.

It is noted that the estimated turning curvature g(Str(p)) to be input to the vehicle position estimating section 40 may be derived by using the turning characteristic map as shown in FIG. 4 predefined based on measurement, based on the output Str(p) of the steering angle sensor 16. Alternatively, the estimated turning curvature g(Str(p)) may be derived simply by a fixed overall gear ratio q and a length L of the wheelbase (i.e., estimated turning curvature=Str(p)/L·η).

According to the test results of side-by-side type parking and end-to-end type parking, the error in estimation of the vehicle position in the case of applying the "slowing operation" is significantly reduced with respect to that in the case of not applying the "slowing operation".

Further, even in the case of changing conditions on a parking trajectory, a load, the air pressure of a tire, and the degree of abrasion of a tire, the error is significantly smaller when the "slowing operation" applied.

However, in this embodiment, in order to further reduce the error, it is also possible to control "a degree (amount) of slowing" according to changes in characteristics of a tire, such as changes in the degree of abrasion, temperature and air pressure of a tire, and the like. For example, the "degree (amount) of slowing" may be increased as the air pressure of the tire decreases, based on detection of the air pressure of the tire by air pressure monitoring means.

Further, it is found from the test results by the inventors of the present invention that the abrasion of the tire has a larger impact on the error than other factors, such as the speed of the vehicle, the load carried by the vehicle, and the air pressure of the tire. Thus, the "degree of slowing" (i.e., the coefficients N and M) may be varied according to the degree of tire abrasion. For example, the "degree (amount) of slowing" may be decreased as the total traveling distance of the vehicle increases, based calculating the total traveling distance of the vehicle after exchange of a tire.

Similarly, the "degree of slowing" (i.e., the coefficients N and M) may be varied according to the estimated friction coefficient of the road. In this case, the friction coefficient of the road may be estimated based on the difference in rotation between wheels to which braking is applied and driven wheels. Then, the influence of the wetness of the road may be taken into account based on detection by a rainfall sensor or the presence or absence of operation of windshield wipers. Further, the friction coefficient can be estimated based on the predetermined vibration components of the wheel speed derived from the output signals of the wheel speed sensors, as described in JP11-78843. Further, the friction coefficient can be estimated based on the damping characteristics of the response components of the wheel speed when the braking load changes in a stepwise manner, or estimated based on the back-scattered wave of an ultrasonic wave, a millimeter wave and the like emitted toward the forward area of the road.

It is also possible to vary the "degree of slowing" (i.e., the coefficients N and M) according to the parameters related to the degree of the deformation of the tire. For example, the "degree of slowing" may be increased in the case of the absolute steering angle exceeding the predetermined threshold or the "degree of slowing" may be increased with the increase in the absolute steering angle. Further, the "degree of slowing" may be varied according to a rate of change in the absolute steering angle (i.e., a steering speed).

The present invention is disclosed with reference to the preferred embodiments. However, it should be understood that the present invention is not limited to the above-described embodiments, and variations and modifications may be made without departing from the scope of the present invention.

For example, since steering control free from high-frequency components (gain is not set high) is implemented in the aforementioned embodiment, the "slowing operation" can be carried out by using the first-order delay formula as above-mentioned. However, the "slowing operation" may also be carried out by using second-order delay formula.

Further, in the aforementioned embodiment, the estimated turning curvature g(Str(p)) is first derived by using the turning characteristic map based on the steering position Str(p) detected by the steering angle sensor 16, and then the "slowing operation" is applied to the estimated turning curvature g(Str(p)). However, it is also possible to first apply the "slowing operation" to the steering position Str(p) detected by the steering angle sensor 16 and then derive the g(Str'(p)) by using the turning characteristic map based on the steering position Str'(p), that has been subject to the "slowing operation". In other words, the "slowing operation" may be applied at any stage of the turning curvature calculating process.

Further, in the aforementioned embodiment, the vehicle position is estimated based on the steering position Str(p) of the steering angle sensor 16, considering the fact that the target steering angle does not necessarily correspond to the steering position Str(p) of the steering angle sensor 16 at the corresponding time. However, the vehicle position may be estimated based on the target steering angle instead of the steering position Str(p) of the steering angle sensor 16.

The invention claimed is:

1. A guiding device for guiding a vehicle to a target position by controlling a steering angle while estimating a vehicle position at least based on a steering angle value, wherein in estimating the vehicle position, a slowing operation with respect to a change in a moving distance of the vehicle is applied to a turning curvature that is estimated based on the steering angle value, and a compensation for a dynamic delay of the turning curvature due to a torsional deformation of a tire of the vehicle is performed.

2. The guiding device as claimed in claim 1, wherein a degree of slowing in the slowing operation is controlled based on detection of changes in a characteristic of the tire.

3. The guiding device as claimed in claim 2, wherein the characteristic of the tire includes a degree of abrasion of the tire, temperature of the tire or air pressure of the tire.

4. The guiding device as claimed in claim 1, wherein a degree of slowing in the slowing operation is controlled based on a degree of abrasion that is estimated by calculating a total traveling distance of the vehicle.

5. The guiding device as claimed in claim 1, wherein a degree of slowing in the slowing operation is increased when an absolute steering angle exceeds a predetermined threshold.

6. The guiding device as claimed in claim 1, wherein a degree of slowing in the slowing operation is increased as an absolute steering angle increases.

7. The guiding device as claimed in claim 1, wherein a degree of slowing in the slowing operation is controlled based on detection of a friction coefficient of a road.

8. A vehicle position estimating device, comprising: a detector for detecting a moving distance of a vehicle; a change amount calculator for calculating an amount of a change in a direction of the vehicle every small moving distance based on a steering angle value; and a vehicle position estimator for estimating a position of the vehicle based on the amount of the change in the direction of the vehicle calculated by the change amount calculator; wherein in calculating the amount of the change in the direction of the vehicle, the change amount calculator applies a slowing operation with respect to a change in a moving distance of the vehicle to a turning curvature that is estimated based on the steering angle value, and performs a compensation for a dynamic delay of the turning curvature due to a torsional deformation of a tire of the vehicle.

* * * * *